Feb. 6, 1962 E. J. KRAUS ET AL 3,019,501

FASTENER

Filed Aug. 13, 1959

INVENTORS
EDMUND J. KRAUS,
ROBERT A. KRAUS
BY
*Angus & Mon*
ATTORNEYS.

United States Patent Office 3,019,501
Patented Feb. 6, 1962

3,019,501
FASTENER
Edmund J. Kraus and Robert A. Kraus, Gardena, Calif., assignors to Kirk-Wing Company, Vega Baja, Puerto Rico, a corporation of Puerto Rico
Filed Aug. 13, 1959, Ser. No. 833,598
2 Claims. (Cl. 24—213)

This invention relates to a push-button type fastener or detachably joining bodies together.

An object of this invention is to provide a fastener for applications such as stressed panels and the like, wherein a pair of bodies such as a frame and a cover plate are joined together. This fastener enables the bodies to be joined by the push of a button, and to be detached from each other by a second push on the same button.

According to this invention, a receptacle is attached to one of the bodies to be joined, and a plunger is reciprocably mounted to the second of the bodies. The receptacle is provided with a first and a second shoulder, with a release member inside it which can shift back and forth between the shoulders. The first shoulder and the release member have apertures into which a part of the plunger can enter.

The plunger is mounted to the other of the bodies, and is spring-loaded so as to be moved away from the receptacle when the two parts of the fastener are aligned for engagement with each other. The plunger includes at least one spring prong that is sprung laterally outward from the plunger's central axis. The prong includes a catch shoulder to hook over the back of the first shoulder of the receptacle, to hold the plunger to the receptacle, thereby joining the bodies. Pressing the plunger after such engagement causes the spring prong to enter the release member and be compressed by it. Then, with the release member and the spring prongs in frictional engagement, the plunger can be backed out until the release member strikes the first shoulder of the receptacle at which time the catch shoulder of the spring prong is past the first shoulder and the plunger is thus released from the receptacle.

Figure 1:
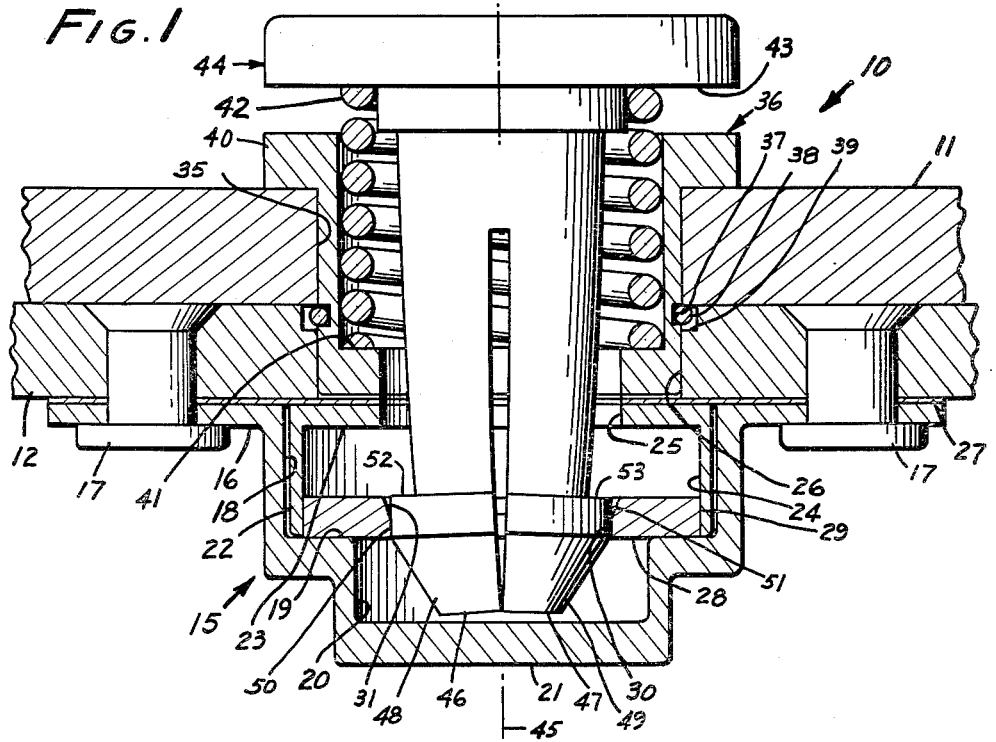
Figure 2:
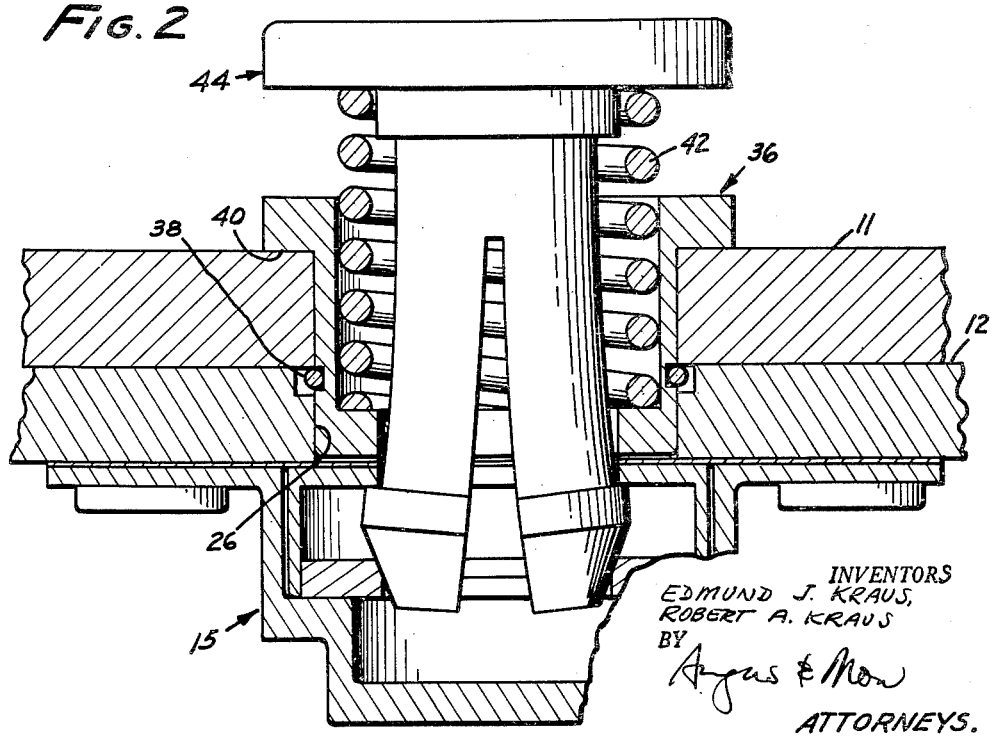

The above and other features of this invention will be fully understood from the following detailed description and the accompanying drawings, in which:

FIG. 1 is a side elevation, partly in cutaway cross-section, showing a fastener according to the invention about to be detached; and FIG. 2 is a side elevation, partly in cutaway cross-section, showing the fastener engaged and holding a pair of bodies together.

In FIG. 1, a fastener 10 is shown holding plates 11, 12 together. A typical example of the fastener's usefulness is for plate 11 to be a cover plate, and plate 12 part of an internal panel structure.

The fastener includes a continuous-walled unyielding receptacle 15. The receptacle has flange 16 by means of which the receptacle can be joined by rivets 17 to plate 12. The receptacle has a retainer wall 18, an annular shoulder 19 (sometimes called "second shoulder"), a recess 20, and a cap 21.

Within the retainer wall and forming part of the receptacle there is an insert 22 which has an annular shoulder 23 (sometimes called "first shoulder") and a cylindrical sidewall 24. The outer periphery of the sidewall is somewhat less in diameter than the inner periphery of the retainer wall so that the insert can shift slightly from side to side to compensate for small misalignments.

First shoulder 23 has an aperture 25 therein which is preferably circular. The aperture may be made any desired size relative to hole 26 through plate 12.

A shim 27 may be placed between the receptacle and the plate.

A release member 28 comprises a flat annular washer having an outer wall 29 with a contour which corresponds to that of the sidewall of the insert. The sidewall extends from shoulder to shoulder. The release member is reciprocable between the shoulders. The release member has an aperture 30 with a chamfer 31. The diameter of the aperture immediately adjacent to the chamfer preferably is slightly smaller than the diameter of aperture 25.

Plate 11 has a hole 35 therein of the same diameter as hole 26. A retainer 36 has an exterior groove 37 which receives snap ring 38. The snap ring projects into countersink 39 in plate 12, behind plate 11, and thereby holds the retainer to plate 11. The retainer fits snugly in holes 26 and 35, and provides shear strength to the joint made by the fastener.

The retainer is cup-shaped, and includes an annular flange 40 which bears against the upper surface of plate 11. The retainer has an inner shoulder 41 which supports a bias spring 42. The bias spring, in turn, is opposed to a push-button head 43 on a plunger 44. The plunger is biased by the spring away from the receptacle when the receptacle is aligned with the plunger in operative alignment therewith.

The plunger has a central axis 45. Its end remote from the head is split to form a pair of spring prongs 46, 47, two being shown, although more or fewer could be provided. The spring prongs are bent outward, away from the central axis. The tips 48, 49 of the spring prongs are tapered. Adjacent to the taper there are substantially cylindrical portions 50, 51 for making a frictional engagement with that part of aperture 30 adjacent to chamfer 31. Adjacent to the cylindrical portions, the prongs have catch shoulders 52, 53, respectively.

The joinder of two bodies by the fastener will be described by initial reference to FIG. 2. Retainer 36 is shown already fastened to plate 11 by the engagement with the plate of flange 40 and snap ring 38. Its lower end is inserted into hole 26 of plate 12 where it serves to hold plates 11 and 12 from slipping relative to each other. The retainer thereby provides shear strength for the joint. The retainer can be made as strong as desired for that purpose.

The holes in the bodies are thereby lined up, and the plunger is spring-loaded away from the receptacle by spring 42. The catch shoulders hook over the lower end of the retainer when the plunger is not in the receptacle, and this keeps the plunger from being thrust out of the receptacle by the action of the spring.

With the retainer and receptacle aligned, a push on the plungerhead moves the tapered tips of the prongs into the receptacle, where they snap over the first shoulder of the receptacle. The prongs are flexible enough to be sprung in so that the catch shoulders can move beyond the first shoulder. The chamfer of the release member is engaged by the prong tips, and is pushed along ahead of the plunger. It does not tend to compress the prongs together at this time. The release member is thereby moved down until it strikes the second shoulder in the receptacle. About this time, the catch shoulders of the prongs snap over the back side of the first shoulder of the receptacle and the device is held assembled.

The disassembly of the fastener is illustrated in FIG. 1. The push-button is given another push, which causes the tapered tips of the spring prongs to enter recess 20 and the cylindrical portions of the prongs to climb up on the cylindrical portion of aperture 30. The outwardly-directed springing force of the prongs against the solid ring release member results in a frictional engagement between the two which keeps them engaged, although it does not expand the ring member. Therefore, the ring member, although compressing the prongs together, is still freely slidable between the shoulders of the receptacle. The push-button is released, and the bias spring moves the plunger away from the receptacle. As a result of the frictional engagement between the spring prongs and the release member, the two move in unison until the release member strikes the first shoulder of the receptacle. The plunger keeps on moving while the release member is held against further movement. As can be seen in FIG. 1, there is enough axial length of the release member that it holds the spring prongs closed long enough for the spring prongs to reach and contact the inside surface of the inside shoulder. This gets the catch shoulders past the first shoulder of the receptacle, and thereafter the plunger can move unimpeded out of the receptacle, and the fastener is disassembled.

This invention thereby provides a simple fastener which can be assembled and disassembled by simply pressing a single push-button, and which can be given as great strength for axial grip and for shear resistance as desired. It is only necessary to alter the materials of construction and the relative dimensions in order to achieve whatever strengths are desired.

This invention is not to be limited by the embodiment shown in the drawings and described in the description, which is given by way of example and not of limitation, but only in accordance with the scope of the appended claims.

We claim:

1. A fastener for joining two objects together comprising: a retainer adapted to enter into and engage the walls of aligned holes through said objects, and including an interior opening, an interior shoulder, an exterior flange, and an exterior snap-ring groove, and a snap-ring in said groove, whereby said retainer is attachable to a first of said objects by engagement between the exterior flange and the snap-ring; a plunger having a central axis, and passing through said retainer, said plunger including a stem with an enlarged head at one end thereof, the other end of said plunger being split to form a plurality of spring-like prongs which are bent outwardly from the said axis, the end of each of said prongs having a tapered section, a substantially cylindrical section adjacent to said tapered section, and a catch shoulder on the other side of the cylindrical section from the tapered section; bias spring means disposed between the interior shoulder of the retainer and the enlarged head of the plunger, biasing the head of the plunger away from the retainer; a receptacle attached to the second of said objects, said receptacle having an inner wall; an insert within said receptacle and having an outer wall of lesser respective lateral dimensions than said inner wall so as to be laterally shiftable therein, at least one of said dimensions being greater than a corresponding dimension of the hole in the adjacent object, so that the insert is prevented from passing into said hole; a first shoulder on said insert extending inwardly from said outer wall and having an aperture therein; a substantially cylindrical inner wall inside said insert extending away from the first shoulder; a second shoulder on said receptacle adjacent to said cylindrical inner wall; and an unyielding annular release member having an opening therethrough, said release member being disposed inside said insert and reciprocable between the said first and second shoulders, whereby, with the receptacle in the holes in the objects in substantial alignment with the receptacle, the plunger may be pressed past the first shoulder so that the catch shoulders hook over the said first shoulder, and whereby another push on the pushbutton forces the prongs into the release member, where they are engaged and compressed, and the bias spring then backs off the plunger so that it carries the release member until it strikes the first shoulder, thereby releasing the prongs from engagement therewith, the prongs thereby passing through the first shoulder to detach the plunger from the receptacle, the insert being laterally shiftable to compensate for misalignments between the receptacle and retainer.

2. A fastener according to claim 1 in which the release member comprises a solid washer, said washer having a central aperture with a chamfer at said aperture facing the first shoulder.

References Cited in the file of this patent

UNITED STATES PATENTS

| 1,727,134 | Schmittgen | Sept. 3, 1929 |
| 2,684,516 | Zahodiakin | July 27, 1954 |

FOREIGN PATENTS

| 955,180 | France | June 20, 1949 |